(12) United States Patent
Lehtinen

(10) Patent No.: US 6,232,913 B1
(45) Date of Patent: May 15, 2001

(54) METHOD AND SYSTEM FOR MEASURING RADAR REFLECTIVITY AND DOPPLER SHIFT BY MEANS OF A PULSE RADAR

(76) Inventor: Markku Sakari Lehtinen, Tahtelantie 48 as 21, FIN-99600 Sodankyla (FI)

( * ) Notice: Subject to any disclaimer, the term of this patent is extended or adjusted under 35 U.S.C. 154(b) by 0 days.

(21) Appl. No.: 09/275,479

(22) Filed: Mar. 24, 1999

(30) Foreign Application Priority Data

Mar. 26, 1998 (FI) ......................................................... 980677

(51) Int. Cl.[7] .................................................. G01S 7/285
(52) U.S. Cl. ............................. 342/137; 342/25; 342/26; 342/104; 342/115; 342/118; 342/134; 342/175; 342/192; 342/194; 342/195; 367/87; 367/88
(58) Field of Search ................................ 342/26, 25, 118, 342/134, 137, 175, 190–197, 82, 89, 104, 115, 135, 27, 28; 367/7, 8, 9, 10, 11, 87, 88, 89, 90, 93, 94

(56) References Cited

U.S. PATENT DOCUMENTS

| | | |
|---|---|---|
| 5,173,706 | 12/1992 | Urkowitz ................................ 342/99 |
| 5,311,183 * | 5/1994 | Matthews et al. ...................... 342/26 |
| 5,319,586 | 6/1994 | Gupta et al. . |
| 5,394,155 * | 2/1995 | Rubin et al. .......................... 342/192 |
| 5,548,798 | 8/1996 | King . |
| 5,617,099 | 4/1997 | Warren et al. ......................... 342/159 |
| 5,724,125 | 3/1998 | Ames . |
| 5,760,734 | 6/1998 | Urkowitz ............................... 342/159 |
| 5,805,107 | 9/1998 | Schroth et al. ........................ 342/189 |
| 5,808,580 | 9/1998 | Andrews, Jr. ......................... 342/162 |

FOREIGN PATENT DOCUMENTS

| | | |
|---|---|---|
| 4039153 | 9/1997 | (DE) . |
| 0897527 | 11/1990 | (EP) . |
| 2709184 | 2/1995 | (FR) . |

OTHER PUBLICATIONS

"Radar and Its Environment", pp. 60–61.
"A New Modulation Principle for Incoherent Scatter Measurement", Markku S. Lehtinen and Ingemar Häggström, *Radio Science,* vol. 22, No. 4, pp. 625–634, Jul.–Aug. 1987.
"The Use of Multipulse Zero Lag Data to Improve Incoherent Scatter Radar Power Profile Accuracy", Markku S. Lehtinen and Asko Huuskonen, *Journal of Atmospheric and Terrestrial Physics,* vol. 28, Nos. 9–10, pp. 787–793, 1986.

* cited by examiner

*Primary Examiner*—Bernarr E. Gregory
(74) *Attorney, Agent, or Firm*—Ronald C. Fish; Falle & Fish

(57) ABSTRACT

Characteristics of a target are measured by a radar or sonar. Pulses (101, 102, 103) are transmitted and in between (X) the transmissions of pulses a signal is received which depends on the transmitted pulses and on the distribution of the characteristics measured at different ranges. The distribution at different ranges of the characteristics measured is determined by representing it by means of a substantially linear system of equations in which the variables are the values of the characteristics measured at desired ranges, and by solving the system of equations for the variables. The transmitted pulses form a cyclically repeated pulse code or a continuously changing pulse train.

14 Claims, 2 Drawing Sheets

METHOD AND SYSTEM FOR MEASURING RADAR REFLECTIVITY AND DOPPLER SHIFT BY MEANS OF A PULSE RADAR

TECHNOLOGICAL FIELD

The invention relates in general to pulse radar system and to measurements made thereby. In particular the invention relates to pulse radar measurements in which a new pulse has to be transmitted before the previous pulse has passed the measurement volume by. Exemplary fields of application include weather, surveillance and remote sensing radars as well as sonar systems.

BACKGROUND OF THE INVENTION

A pulse radar comprises a transmitter and a receiver. The transmitter transmits a finite-length radio wave pulse which is scattered or reflected from a medium or solid target. The receiver may be used to measure the reflected signal's power or Doppler shift or both. Samples are taken from the received signal so that the power can be calculated by squaring the samples taken. The power measurement yields information about the radar reflectivity of the target or medium; the reflectivity is often referred to as the scattering or reflecting cross section. Doppler shift estimates are based on the signal's autocorrelation function values which are obtained by multiplying the samples by samples delayed in accordance with a desired delay value. Typical pulse radar applications include weather radars in which power measurements are used to determine rainfall and delay measurements are used to determine wind speeds. Surveillance radars measure the location and movement of aircraft, ships and other targets. Remote sensing radars are used in satellites, airplanes or helicopters to measure various features of the Earth's surface. In addition, there exist scientific radar apparatuses for ionospheric measurements (at heights of 70 to 1000 km) and measurements of the lower atmospheric layers (mesosphere-stratosphere-troposphere, or MST, radars). Sonar is a radar-like apparatus used for underwater measurements based on acoustic waves instead of radio waves, and a lidar is basically a radar where laser light is used instead of radio waves. An object or medium, whose location and/or movement is measured by means of the radar, may be called a target in general. The three-dimensional space in which the measurement is carried out is called the measurement volume.

As an example, let us consider weather radar measurements employing uniform transmission of pulses. The pulse repetition frequency (PRF) is chosen according to the particular measurement.

When measuring radar reflectivity, a low enough PRF (300 to 500 Hz) is used so that a transmitted pulse will leave the measurement volume before the next pulse is transmitted. Thus, the received signal will only contain responses from one measurement volume, yielding an unambiguous reflectivity measurement result. The maximum measurement range $r_{max}$ may then be calculated according to the equation $$r_{max} = cT/2, \quad (1)$$

where c is the velocity of the radio waves (acoustic waves in the case of sonar; light in the case of lidar) in the medium, and T is the time separation between adjacent pulses, i.e. the inverse of the pulse repetition frequency. For example, for radio waves transmitted through the air at a repetition frequency of 500 Hz the time separation between adjacent pulses is 2 ms and the maximum measurement range is 300 km.

When measuring wind speed, the time separation between adjacent pulses determines the maximum velocity $v_{max}$ that can be unambiguously measured. It may be defined as $$v_{max} = (\lambda/4) \cdot PRF, \quad (2)$$

were $\lambda$ is the wavelength. At 5.6 GHz, which falls within the widely used radar frequency range called the C band, we get $v_{max} = 0.0134$ PRF, when the velocity is given in meters per second and the repetition frequency is given in Hz. A typical PRF is 1 kHz, in which case the maximum measurable velocity is 13.4 meters per second.

Equations (1) and (2) show that as the PRF increases, the maximum velocity increases but the maximum unambiguous range decreases and vice versa. In real-life measurements it is not always possible to simultaneously measure both the velocity and the range, at least not accurately. In the literature, this phenomenon is referred to as the range-Doppler dilemma or the range-velocity ambiguity (cf. e.g. Doviak and Zrnic, "Doppler radars and weather observations," Chapter 3.6, Academic Press, 1993). No solution was known to this problem in September 1994 (COST 75 Weather Radar Systems, International Seminar, Brussels, Belgium, Sep. 20–23, 1994, EUR 16013 EN, 1995; U.S. Department of Commerce, NOAA, Notice for Proposal Solicitation for a solution to "Doppler Dilemma").

Below it is mentioned known attempts to solve the problem described above. U.S. Pat. No. 3,935,572 discloses a system employing four parallel measurement channels. U.S. Pat. No. 3,987,443 discloses a radar in which the PRF is changed from time to time. In U.S. Pat. No. 4,328,495 each pulse comprises phase-coded sub-pulses. U.S. Pat. No. 4,924,231 discloses a method for processing a great quantity of transmitted signals and their echoes in order to find the best correlation. U.S. Pat. No. 5,027,122 discloses a method for improving Doppler measurement by means of signal processing. In U.S. Pat. No. 5,247,303 the pulses are divided into frames, and at least one pulse in each frame is purposely distorted. U.S. Pat. No. 5,276,453 discloses a method based on the use two different signal frequencies. The invention disclosed in U.S. Pat. No. 5,583,512 uses a common two-dimensional correlator for the simultaneous determination of range and Doppler shift. U.S. Pat. No. 5,621,514 discloses a system which employs light pulses instead of radio frequencies and in which the received signal is processed to determine the Doppler shift. U.S. Pat. No. 5,659,320 deals with sonar without delving into the contradiction between the velocity and reflectivity measurements. U.S. Pat. No. 5,724,125 describes another light-pulse based measurement arrangement with multiple repetitions and signal processing in a system of linear equations. PCT application document WO 96/00909 and the corresponding U.S. Pat. No. 5,442,359 disclose arithmetic methods for processing a received signal.

If the continuity of the measurement is not important, the problem described above may be solved using a method based on so-called multipulse codes, disclosed e.g. in a publication called "Multiple-pulse incoherent-scatter correlation function measurement" by Farley, Radio Science, 7, pp. 661–666. In said method a small number of pulses (ordinarily 3 to 6 pulses) are transmitted such that all pulse intervals are unequal in addition to being (small) multiples of one interval. Transmission is then stopped and reception started. Transmission is not started again until the last pulse of the previous pulse train has traveled very far, typically about 2000 km. This method has been applied especially to ionosphere radar measurements in which the area of interest lies very far away from the radar. In that case it is only useful that echoes coming from near the radar are not received due to the late start of the reception. The method is not suitable to weather radar and short-range surveillance radar applications since data are obtained only from areas located far away from the radar.

In a multipulse code based measurement, the shortest pulse interval determines the greatest measurable velocity in accordance with Equation (2). The total length of the transmitted multipulse code limits the greatest determinable autocorrelation function delay value, but unambiguous measurement of velocity is in principle possible at ranges of arbitrary length. Power measurement is not unambiguous but yields a sum of powers reflected from a plurality of different ranges. The data received in one power measurement thus constitute the combined data from a number of ranges, said number equaling the number of pulses in the code. This kind of power measurement was once regarded as useless, but subsequently a method for utilizing the measurement has been disclosed in the article "The use of multipulse zero lag data to improve incoherent scatter radar power profile accuracy" by Lehtinen and Huuskonen, J. Atmos. Terr. Physics, 48, pp. 787–793, which is incorporated herein by reference. The efficiency of the multipulse measurement has been improved by the use of so-called alternating codes as in the article "A new modulation principle for incoherent scatter measurements" by Lehtinen and Häggström, Radio Science, 22, pp. 625–634, which is also incorporated herein by reference; alternating codes appear to be considerably more effective than the previously known multipulse codes.

SUMMARY OF THE INVENTION

An object of the present invention is to provide a method and a system that solve the conflict between the power measurement and Doppler measurement without the drawbacks related to the use of known multipulse codes.

The objects of the invention are achieved by representing the measurement values by a substantially linear system of equations depending on unknown values of the characteristics measured, and by applying the inversion theory to the solution of said systems of equations.

The method according to the invention is characterized in that it determines the distribution of the characteristics measured along a measurement direction at the different ranges by representing said distribution by means of a substantially linear system of equations where the variables are the values of the characteristics measured at the desired ranges, and by solving said substantially linear system of equations for said variables.

The invention is also directed to a system characterized in that it comprises means for solving a substantially linear system of equations, in which the variables are the values of the characteristics measured at the desired ranges from the system along a certain measurement direction.

In accordance with the invention the transmitter of a pulse radar transmits an essentially continuous pulse train in which the pulses are located at unequal intervals. The pulse train is most advantageously periodic so that a given code consisting of pulses succeeding each other at unequal intervals is repeated after a given so-called cycle time. The cycle time is chosen at least as long as the time in which a given pulse will leave the measurement volume. However, the invention is also applicable to the use of non-periodic, continuously alternating pulse trains. The receiver is receiving substantially at all those times that the transmitter is not transmitting. The received power is sampled, thus producing a set of consecutive samples. Each sample may be presented as a sum contributed to by a given number of pulses that preceded the sample. The amount of contribution is determined by a certain weighting function. In addition, the samples contain noise.

In order to determine the reflectivity or a corresponding quantity for all the desired ranges, a linear system of equations is created where the unknowns are the desired values of the quantities measured, and their coefficients are determined on the basis of the transmitted pulses and weighting functions in a manner described later on. The values of the quantities measured are determined by solving said system of equations for the unknowns using mathematical means known as such, e.g. statistical inversion theory.

For the Doppler measurement, a desired number of autocorrelation function values are produced by multiplying the sample sequence by its delayed copies. The resulting so-called delayed products depend on the target's scatter autocorrelation function at the different ranges represented by a linear system of equations in the same manner as above in the case of reflectivity, and the desired values are obtained by solving said system of equations in similar manner as in the case of reflectivity. With suitably selected pulse intervals, each delay measurement depends only on one range so that solving the system of equations representing the measurements is easy.

The invention makes it possible to unambiguously determine a variable measured by a radar also in a situation where responses arriving from a plurality of pulses (or in the case of delays, from a plurality of pulse pairs separated by equally long intervals) are mixed in the radar's receiver.

BRIEF DESCRIPTION OF DRAWINGS

The invention will now be described in more detail with reference to the preferred embodiments presented by way of example and to the accompanying drawing wherein.

DETAILED DESCRIPTION OF THE INVENTION

Let us first consider in general a situation in which the transmitter of a pulse radar or sonar transmits in succession a set of N identically shaped, relatively short pulses. Let the instant of transmission of the $n^{th}$ pulse be $t^n$, where n is given the values from 1 to N. Phases of the pulses may be either random or preselected. At the same time, the receiver of the pulse radar or sonar takes samples from the received signal. Samples are advantageously taken at uniform intervals, and for simplicity's sake it can be assumed that the length of the sampling period equals the duration of a single pulse; these are not, however, limiting factors to the applicability of the invention.

Figure 1:
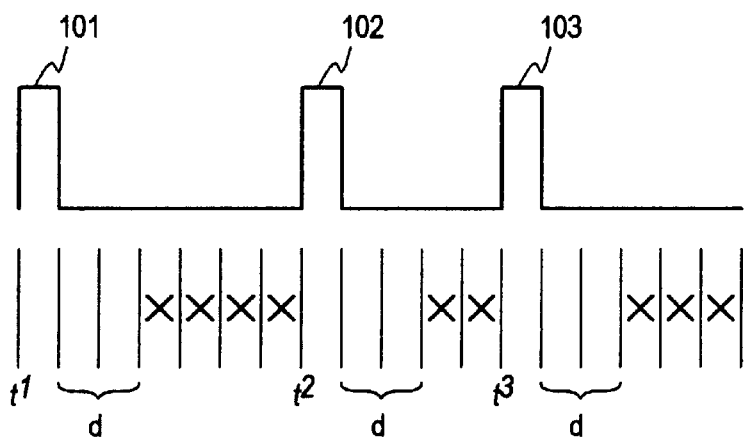
FIG. 1 shows a simple pulse train.

To get meaningful measurement results it is not advantageous for the receiver to take into account samples taken during the transmission of a pulse or immediately after it, during a so-called guard time. FIG. 1 shows a simple timing diagram in which the transmitter transmits pulses 101, 102 and 103 at instants $t^1$, $t^2$ and $t^3$ and the receiver takes samples in time slots marked by X. The guard time is marked by letter d, and in this example its length is two time slots.

If the set has N pulses, it also has N reception periods (each pulse is followed by a reception period which begins at the end of the guard time and ends at the transmission of the next pulse). Let the samples taken during the $n^{th}$ reception period be $z_m^n$, where m is given values from 1 to $N_n$. If the pulses are at irregular intervals, different reception periods have different numbers of samples. The sampling moments can be mathematically determined from the equation $$t_m^n = t^n + d + m\Delta t \qquad (3)$$

where $\Delta t$ represents the length of the sampling period. The power received during one sampling period is a sum of reflected signals coming from different ranges, which signals are written as $P(k\Delta t)$, and noise power $P_s$. Mathematically, $$Z_m^n = \sum_k A_m^n(k\Delta t)P(k\Delta t) + P_s \qquad (4)$$

Weighting functions $A_m^n(k\Delta t)$ can be calculated from the weighting, or ambiguity, functions of the measurement in a known manner discussed e.g. in the reference documents mentioned above. A weighting function tells which ranges influence the received signal. A given weighting function substantially indicates at what range the previous transmission pulse is at moment $t_m^n$. Only certain latest transmission pulses need to be taken into account since in the radar measurement it is possible to determine a certain target-specific maximum range beyond which no significant echoes will be received. In weather radar applications, for example, the specification of the maximum range is based on the fact that although the pulses are transmitted at a so-called zero elevation, or horizontally with respect to the transmission point, a pulse, which propagates along a straight line, will, after having traveled a certain distance, escape above the meteorologically relevant layers of the atmosphere because of the curvature of the Earth's surface.

When the receiver receives for the whole duration of the sending of the pulse train (ignoring the samples taken during transmission and guard time), the result is a finite set of samples $Z_m^n$. These may be presented as elements of a certain vector Z. Likewise, the weighting functions $A_m^n(k\Delta t)$ may be presented as matrix A and the reflected signals $P(k\Delta t)$ may be presented as vector P. A measurement made on the basis of one pulse train may thus be given as matrix $$Z = AP + P_s \qquad (5)$$

which is a known way of representing a linear system of equations. The unknowns are the powers reflected from the different ranges, represented by vector P. Using the linear inversion theory, a solution estimate may be given for the system of equations (5):

$$\overline{P} = \Sigma_p A^T \Sigma^{-1} Z \qquad (6)$$

where $\Sigma$ is a so-called measurement error covariance matrix and $\Sigma_p$ is a so-called solution covariance matrix which may be written as $$\Sigma_p = (A^T \Sigma^{-1} A)^{-1} \qquad (7)$$

If an identity matrix is used as the measurement error covariance matrix $\Sigma$, the solution given is the same as the often used pseudo inverse solution. A better accuracy for the solution can be achieved by using, instead of the identity matrix, a measurement error covariance matrix that can be either estimated from the measured data or calculated theoretically in a known manner disclosed e.g. in a publication called "The accuracy of incoherent scatter measurements: error estimates valid for high signal levels" by Asko Huuskonen and M. S. Lehtinen, J. Atmos. Terr. Phys., Vol 58, No. 1–4, pp. 453–463, 1996, which is incorporated herein by reference.

From the point of view of the present invention it is not imperative that the equations presented above be used for the inverse solution of the linear system of equations. It is known per se that other, quicker ways may be used to reach the same inverse solution, such as e.g. QR decomposition or SVD solution which are known numeric methods for solving matrix equations.

In certain situations the calculation is made easier by the fact that the solution for the linear system of equations (5) represented by Equations (6) and (7) is substantially comprised of coefficients that are independent of the measurements. The solution shown in Equation (6) may be written more simply as $$\overline{P} = BZ \qquad (8)$$

where matrix B is defined $B = \Sigma_p A^T \Sigma^{-1}$ and can be calculated in advance. Then, as certain samples are obtained by measuring, which samples are written as elements of vector Z, the estimates for the corresponding power values representing different ranges, which estimates represent reflectivity at the different ranges, are elements of vector $\overline{P}$ and can be calculated from Equation (8) using simple multiplication and summing operations.

Figure 2:
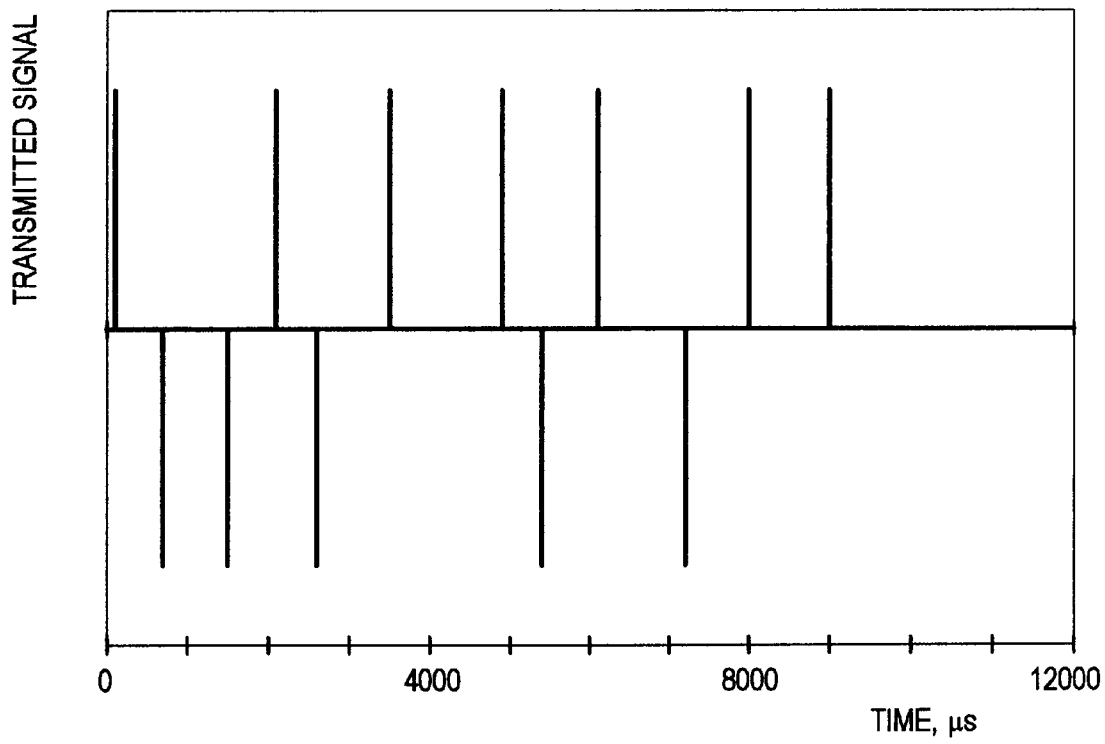
FIG. 2 shows a pulse train suitable to be used in the invention.

FIG. 2 shows a pulse train used in a preferred embodiment of the invention in a co-ordinate system where the horizontal axis represents time and the vertical axis represents the transmitted radio power such that the phase of the pulses above the reference line in the middle of the figure differs by $\pi$ radians from the phase of the pulses below the reference line. Length of the pulse train on the time axis is 12 ms. Length of each pulse is 1 $\mu$s and the pulse interval is about 0.5 ms at the shortest and about 2 ms at the longest. The pulse train is comprised of 12 pulses so that the average PRF is 1000 Hz and the duty cycle is about 0.1%, which corresponds to the duty cycle of a typical prior-art weather radar. Let us assume a weather radar application, in which the maximum range typically is 450 km; the corresponding time is about 3000 $\mu$s. Let us further assume that the sampling time equals the pulse length, i.e. 1 $\mu$s, and the guard time, or the time after the sending of a pulse, during which samples are ignored, is 6 $\mu$s.

The first embodiment of the present invention differs from known multipulse code based methods in that the pulse train in FIG. 2 is transmitted cyclically, i.e. it is repeated again and again without having any significant pause between the repetition cycles. The receiver takes samples of the received signal substantially all the time at intervals of 1 $\mu$s (the sampling time) so that 12,000 samples will be taken during the transmission of the pulse train shown in FIG. 2. Of those samples only 12+12·6=94 will be useless because of simultaneous transmission (1 $\mu$s) or guard time (6 $\mu$s), so that when evaluating the method, we can assume that there are approximately 12,000 samples. The antenna of a weather radar usually moves relatively slowly so that the radar can be assumed to measure substantially the same target for a given time, say 0.5 seconds. The effect of random errors is reduced when the pulse train according to FIG. 2 is repeated during that time and the results from the individual repetition cycles are averaged. Taking into account the assumptions given above, there will be about 40 repetitions to be averaged. Next it will be examined the computing capacity required for processing such an amount of samples.

A second embodiment of the invention applies, instead of a cyclically repeated pulse train, a pulse train which is constantly changing and where no two intervals between pulses have the same length. The last mentioned limitation applies at least to all such pairs of intervals between pulses that are close enough to each other to cause potential unambiguity in a measurement.

Above it was mentioned that the time corresponding to the maximum range of the measurement is about 3000 μs. Since sampling is performed at 1-μs intervals, there are about 3000 unknown power values in vector $\overline{P}$ of Equation (8). Vector Z of Equation (8) contains about 12,000 samples, so the size of matrix B of Equation (8) is about 3000×12,000 elements; this means that Equation (8) represents an arithmetic operation with 3000×12,000 multiplications and an equal number of additions. If such an arithmetic operation has to be done once per 0.5 seconds, the computing capacity required is about 144 Mflops (million floating-point operations per second), which is quite a reasonable demand for a modern computer at the priority date of the present patent application. The computing capacity required by the averaging is here ignored.

Moreover, the need for computing capacity can be radically reduced if necessary. If in the pulse train of FIG. 2 the time differences between the pulses are selected such that they are multiples of a given, relatively small, number, the calculation according to Equation (8) is divided into separate independent sets. Let said relatively small number be K and let the other numeric assumptions mentioned above remain unchanged. Then we get K mutually independent sets such that in each set it is possible to calculate 3000/K power estimates and each set requires 12,000/K (averaged) samples. Equation (8) can be written as $$\overline{P}_k = B_k Z_k; k \in [1, 2, \ldots, K] \quad (9)$$

whereby each matrix $B_k$ is 3000/K×12,000/K and it can be seen that the required computing capacity is reduced to the $K^{th}$ part of the value mentioned above. If K is, say, 10, the computing capacity required is just 14.4 Mflops.

Above it was described power measurement aimed at determining radar reflectivity at various ranges from the radar up to a given maximum range. Next it will described the measurement of the target's scatter autocorrelation function in the method according to the invention, or the so-called Doppler measurement.

Measuring a Doppler shift in the receiver of a pulse radar on the basis of a so-called autocorrelation analysis is known per se, and there exist a number of alternative methods for realizing it. One option is to determine the spectrum of the received signal and match it with a known spectral model, say, Gaussian spectrum, using a known matching algorithm. The matching algorithm finds a frequency shift with which the known spectral model best correlates with the spectrum of the received signal. The resulting shift equals the Doppler shift produced in the signal by a medium or movement of the target, and it can be used to calculate the radial velocity of the medium or target relative to the radar equipment.

Another known method for determining a Doppler shift is disclosed in the U.S. Pat. No. 5,442,359. In that method, a sample sequence representing the received signal is delayed by a time that equals the time difference between certain two pulses, and the correlation of the delayed sample sequence with the undelayed signal is calculated. The correlation is a complex function the phase angle of which is not solved unambiguously but may contain multiples of 2π. In the U.S. Pat. No. 5,442,359 this problem is solved in such a manner that when correlations have been computed for a plurality of different delays, multiples of 2π are added to their phase angles such that the best correlation in a least mean square sense is found for the phase angles and a certain unambiguous Doppler shift.

In the method according to the invention, delayed products are computed from the samples received to determine the Doppler shift, the shape of the spectrum or the spectral moments (width, etc.). When calculating a delayed product for a certain delay, τ, a sample taken at instant i is multiplied by the complex conjugate of a sample taken at instant i+τ. This is repeated for all the possible values of instant i. The delayed products calculated for the various values of τ give the values of the delayed products at the different ranges, which can be calculated on the basis of the sampling moments and pulse transmission moments. These delayed products need only be calculated for delays that correspond to the time difference between certain two pulses in the pulse code transmitted, but these pulses need not be adjacent pulses.

Let the 12 pulses shown in FIG. 2 be denoted in consecutive order by letters from A to L. Pulses transmitted during the next 12 ms are similarly denoted by letters from A' to L'. As the code is repeated identically after 12 ms, the pulse positions on a time scale during the first two cycles are as follows:

TABLE 1

| Pulse | Position, μs | Pulse | Position, μs |
|---|---|---|---|
| A | 120 | A' | 12120 |
| B | 690 | B' | 12690 |
| C | 1440 | C' | 13440 |
| D | 2030 | D' | 14030 |
| E | 2550 | E' | 14550 |
| F | 3490 | F' | 15490 |
| G | 4880 | G' | 16880 |
| H | 5410 | H' | 17410 |
| I | 6090 | I' | 18090 |
| J | 7230 | J' | 19230 |
| K | 7960 | K' | 19960 |
| L | 8940 | L' | 20940 |

From the positions of the pulses on a time scale, as shown in Table 1, it is possible to calculate all possible interpulse time differences. Of those, the 120 smallest are given in microseconds in Table 2. Studying the pulse transmission times listed in Table 1 one can see that e.g. a delayed product calculated for a delay of 520 μs is a product in which samples received after pulse D and samples received after pulse E are multiplied by one another, the difference of the sampling times being then 520 μs.

TABLE 2

| 120 smallest time differences between pulses, μs | | | | | |
|---|---|---|---|---|---|
| 520 | 2430 | 4760 | 6910 | 9400 | 11430 |
| 530 | 2550 | 4890 | 7110 | 9450 | 11470 |
| 570 | 2600 | 5090 | 7240 | 9570 | 11480 |
| 590 | 2800 | 5200 | 7270 | 9650 | 12000 |
| 680 | 2850 | 5290 | 7280 | 9670 | 12520 |
| 730 | 2860 | 5400 | 7320 | 9950 | 12530 |
| 750 | 3080 | 5410 | 7350 | 10080 | 12570 |
| 940 | 3180 | 5450 | 7500 | 10090 | 12590 |
| 980 | 3370 | 5460 | 7530 | 10130 | 12680 |
| 1110 | 3380 | 5480 | 7810 | 10140 | 12730 |
| 1140 | 3440 | 5610 | 7840 | 10180 | 12750 |
| 1210 | 3530 | 5790 | 7940 | 10290 | 12940 |
| 1320 | 3540 | 5930 | 8030 | 10540 | 12980 |
| 1340 | 3740 | 5970 | 8250 | 10610 | 13110 |
| 1390 | 3750 | 6030 | 8260 | 10660 | 13140 |
| 1460 | 3970 | 6070 | 8460 | 10680 | 13210 |
| 1710 | 4060 | 6210 | 8470 | 10790 | 13320 |
| 1820 | 4160 | 6390 | 8560 | 10860 | 13340 |
| 1860 | 4190 | 6520 | 8620 | 10890 | 13390 |
| 1870 | 4470 | 6540 | 8630 | 11020 | 13460 |
| 1910 | 4500 | 6550 | 8820 | 11060 | 13710 |
| 1920 | 4650 | 6590 | 8920 | 11250 | 13820 |

TABLE 2-continued

| 120 smallest time differences between pulses, µs | | | | | |
|---|---|---|---|---|---|
| 2050 | 4680 | 6600 | 9140 | 11270 | 13860 |
| 2330 | 4720 | 6710 | 9150 | 11320 | 13870 |
| 2350 | 4730 | 6800 | 9200 | 11410 | 13910 |

There is a corresponding difference between pulses D' and E'. Since two pulse pairs have the same distance, this is a case of a second trip echo which is known from the conventional weather radar technology. On the other hand, since the transmission moment of pulse pair D' and E' is 12,000 µs later than that of pulse pair D and E, pulse pair D and E has already left the measurement volume before pulse pair D' and E' arrives there and, therefore, the measurement is unambiguous. This is based on the assumption made earlier according to which the maximum measurable range corresponds to 3000 µs: as the exemplary code is selected such that identical interpulse time differences are repeated only every 12,000 µs, each delay measurement (except for the zero lag measurement described above as power measurement) is unambiguous, i.e. the measurement directly produces the autocorrelation function delay value at a given range.

The present invention does not include a limitation according to which a given pulse pair has to leave the measurement volume before another pulse pair with an identical interpulse time difference can be transmitted. If there are two pulse pairs affecting simultaneously, it is possible to apply to the Doppler measurement the inverse solution discussed above in connection with the description of the power measurement. Since the target's characteristic to be measured is then its scatter autocorrelation function, vector Z in the substantially linear system of equations according to Equation (5) represents delayed products calculated for a given delay from samples taken from the received signal at different moments of time. The elements of matrix A represents the weighting, or ambiguity, functions and P is a vector the elements of which represent the actual values of the autocorrelation function at the desired ranges. The system of equations is solved in the same way as above, however taking into account that $\overline{P}$ is a vector the elements of which represent the autocorrelation function estimates at the desired ranges.

Figure 3:
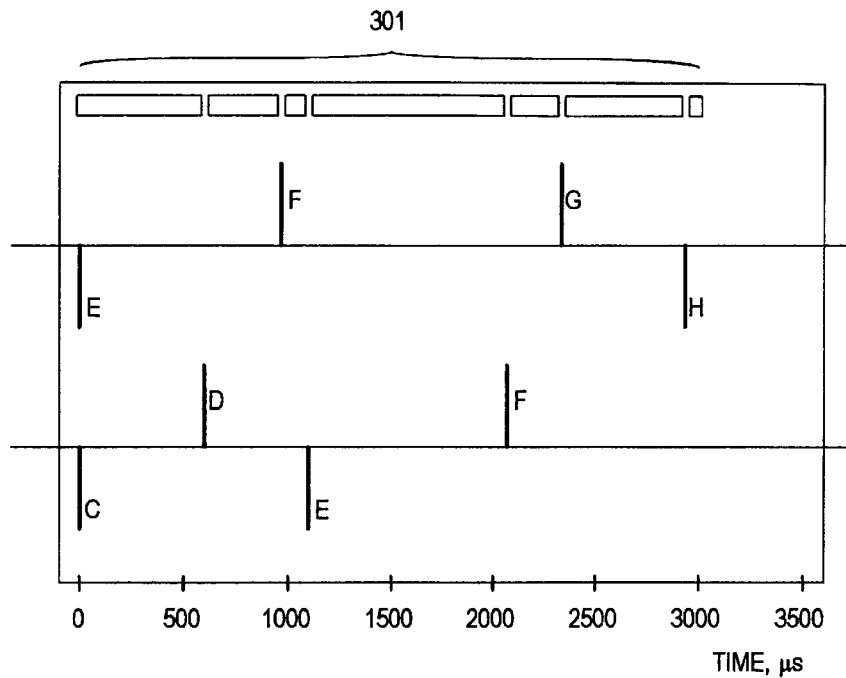
FIG. 3 shows correlation calculation according to the invention.

As a second example let us consider a delay value of 1110 µs which is calculated from pulses C and E (as well as from pair C'–E' and C"–E" etc.). This is illustrated in FIG. 3. It shows some of the transmitted pulses duplicated. The lower pulse train has been moved to the left to such an extent that its zero-time corresponds to the transmission time of pulse C. The upper pulse train has been moved to the left to such an extent that its zero-time corresponds to the transmission time of pulse E. The figure shows that no other pulse pair is coincident on the time axis. The first pulse pair to coincide is C' and E' which is transmitted 12,000 µs later and is therefore not seen in FIG. 3.

It is possible that for some ranges the measurement with the 1110-µs delay cannot be made. If the receiver of the radar has to be switched off for the duration of the transmission of a pulse and remains switched off for a short time after the transmission of the pulse (guard time), measurements are not possible for ranges shorter than a certain minimum range. If, for example, the guard time is 6 µs, the first delayed product, or autocorrelation function estimate for the 1110-µs delay, is obtained when the first sample taken after pulse C (at 1446 µs, 6 µs after the pulse transmission time 1440 µs) and the complex conjugate of the first sample taken after pulse E (at 2556 µs) are multiplied by each other. This product is an estimate at that range from the radar which corresponds to the propagation time of 6 µs. The next product is obtained by adding one sampling interval to both times, and that product relates to a range which corresponds to a propagation time one sampling interval longer. The cross products of the samples multiplied by one another form a so-called delay profile.

So, the measurement cannot be completed for certain ranges as a sample is missing from either of the sample sequences because of the guard time associated with the transmission of pulses. The bar 301 at the upper part of FIG. 3 represents the generation of the delay profile for all ranges corresponding to propagation times from 0 to 3000 µs, and the gaps in the bar 301 represent the ranges for which measurement cannot be performed. The fact that there are no measurement results for certain ranges is not critical because the positions chosen for the pulses in the code ensure that measurements for those ranges will be obtained from other, nearly equal delay values.

Computation of the products could be continued until pulse pair C' and E' is transmitted. Since, however, it was above assumed a maximum range of 450 km, corresponding to 3000 µs, the computation of the delay profile can be stopped at 3000 µs in accordance with FIG. 3, so that it will contain about 3000 sample pairs.

The processing described above is performed on a desired number of delay profiles; the limiting factor mainly being the computing capacity available. Each new delay profile adds to the information contents of the measurement. A known spectral model (e.g. Gaussian spectrum with a Doppler shift) may be matched with the delay profiles using known matching techniques. It is also possible to determine the phase angle in the same manner as disclosed in the aforementioned U.S. Pat. No. 5,442,359.

Figure 4:
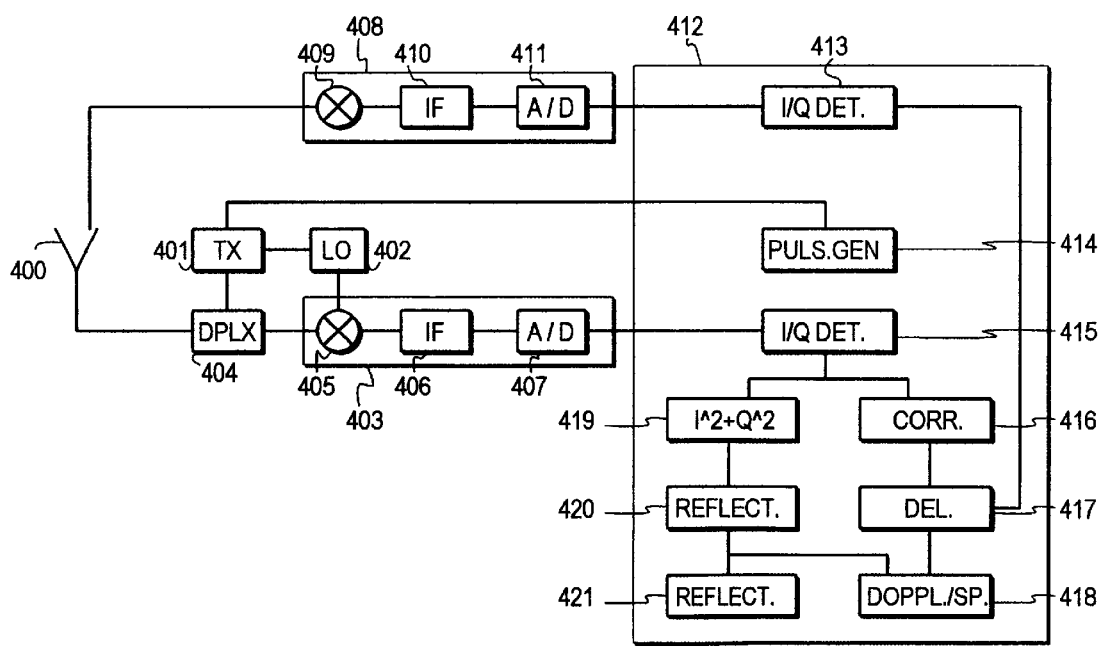
FIG. 4 shows a system according to the invention.

FIG. 4 shows a radar system according to the invention. In this example, an antenna 400 functions as both transmission and reception antenna and the signal is directed from the transmitter 401 to the antenna or from the antenna to the receiver 403 by means of a duplexing switch 404. The receiver 403 comprises in a known manner an intermediate frequency (IF) mixer, IF amplifier 406 and an analog-to-digital converter 407. Mixing frequency comes to the IF mixer 405 and transmitter 401 from a local oscillator 402. In this exemplary radar set a transmitted pulse is measured by a separate receiver 408 which is comprised of corresponding parts: an IF mixer 409, IF amplifier 410 and an analog-to-digital converter 411. Measurement of transmitted pulses is necessary if the transmitter employs a magnetron because in that case the phase of the pulse cannot be directly controlled. With klystron transmitters the phase of the pulse is better known and measurement of transmitted pulses is not necessarily required.

In the exemplary apparatus the transmitter 401 is controlled and the received data are processed by a computer 412. Pulse shapes and pulse trains are generated in a pulse generator 414 by means of software. Signal detection is performed by means of software in an I/Q detection block 415. For the detection of measured transmission pulses the system shown in FIG. 4 has a separate detection block 413. Computation of reflectivity starts with the squaring of the signal in block 419 the result of which is processed so as to become unambiguous with respect to the range by solving in bock 420 the equations representing the response of the measurement. The final radar reflectivity results are produced in block 421. As the reflectivity values for the various ranges have been calculated in accordance with the invention, the final results can be produced and stored and/or displayed to the user in a known manner. In the case of a weather radar, a typical end result is a pattern in which the reflectivity values are interpreted as meteorological phenomena (such as rain of different intensities) and presented graphically using color codes. The invention does not limit the way in which the final results are generated or presented.

Computation of delay values is a little more complicated. The cross products of the samples are computed in block 416 whereafter the equations depending on the range of the delays are solved in block 417. The coefficients of these equations depend on the phases of the transmitted pulses. Therefore, data representing the transmitted pulses measured by receiver 408 are included in the solution of the equations in block 417. The final velocity and Doppler spectrum products are produced in block 418 which may also use the reflectivity data of block 420. As regards the generation and storing and/or presentation of the final results, refer to what was stated above in connection with the final results representing reflectivity.

The method according to the invention and the arithmetic blocks described above are preferably realized in the equipment shown in FIG. 4 in such a manner that the computer 412 comprises at least one program memory in which a stored program controls the operation of the computer 412 so that the method according to the invention is part of said program. Programming the matrix operations, computation of delayed products and other arithmetic operations described above into processes executable by a computer is familiar to a person skilled in the art. The computer 412 may comprise one or more processors to realize the method according to the invention and other tasks relating to the control of the operation of the transmitter 401 and receivers 403 and 408. Preferably the computer 412 also comprises means, which is known per se, for controlling the movement of the antenna 400; for simplicity, said means is not shown in FIG. 4. The system of FIG. 4 may be located in a fixed manner at a ground station or on a vehicle, such as airplane, or it may be realized so as to be portable.

The embodiments of the invention discussed above are exemplary only and do not limit the invention. In particular, the invention does not limit the number of pulses in the cyclically repeated pulse code and how they are positioned over the cycle time, or the composition of a continuously changing pulse train.

What is claimed is:

1. A method for remotely measuring a characteristic of one or more targets at a plurality of ranges along an antenna aiming line, comprising the steps of:

transmitting pulses along said antenna aiming line said transmitted pulses having predetermined characteristics, in between transmission of pulses, receiving reflected signals from one or more targets along said antenna aiming line, said received signals having attributes, said attributes being dependent upon said characteristics of said transmitted pulses and upon a value of said characteristic of said one or more targets at each of said plurality of ranges along said antenna aiming line, said plurality of values of said characteristic at said plurality of ranges being referred to herein as a distribution, using said distribution of values of said characteristic at each of a plurality of ranges along said antenna aiming line as variables in a substantially linear system of equations having a plurality of equations, each equation having a sum of one or more terms where each term is the product of a coefficient having a known value derived from the pulse forms of the transmitted pulse pulse train and an unknown quantity which is referred to herein as a variable, with the plurality of variables in said equations defining a matrix the elements of which are said variables and wherein values of said variables are set equal to the value of said characteristic of said one or more targets at said plurality of ranges along said antenna aiming line, and solving said substantially linear system of equations to derive values for said variables.

2. The method of claim 1, wherein the target's characteristics to be measured is reflectivity, and wherein said substantially linear system of equations is $$Z=AP$$

and its solution is $$\overline{P}=BZ$$

where Z is a vector having elements, said elements representing the squares of samples taken from said received signal at different moments of time, and wherein A is a matrix having elements, said elements of matrix A representing weighting functions, and P is a vector having elements, said elements representing actual reflectivity values at desired ranges, and $\overline{P}$ is a vector having elements, said elements representing reflectivity estimates at the desired ranges, and matrix B is a matrix having elements values of which solve said system of equations.

3. The method of claim 1, wherein the target's characteristic to be measured is an autocorrelation function of scattering caused by said target and said substantially linear system of equations is $$Z=AP$$

and its solution is $$\overline{P}=BZ$$

where Z is a vector having elements, said elements representing delayed products of a certain delay at different moments of time, calculated from samples taken from said received signal, and wherein A is a matrix having elements said elements representing weighting functions, and wherein P is a vector having elements, said elements representing actual values of an autocorrelation function at a plurality of ranges, and $\overline{P}$ is a vector having elements, said elements representing autocorrelation function estimates at a plurality of ranges, and matrix B is a matrix having elements values of which solve said system of equations.

4. The method of claim 2 or 3, wherein matrix B is defined as $B=\Sigma_p A^T \Sigma^{-1}$, where $\Sigma$ is a covariance matrix of measurement errors and $\Sigma_p$ is a covariance matrix of the solution.

5. The method of claim 2 or 3, wherein matrix B is calculated in advance in order to speed up the processing of measurement results.

6. The method of claim 5, wherein matrix B is defined as $B=3_p A^T 3^{-1}$ where 3 is a covariance matrix of measurement errors and $3_p$ is a covariance matrix of the solution.

7. The method of claim 5, wherein matrix B is calculated in advance in order to speed up the processing of measurement results.

8. The method of claim 1, additionally comprising the steps of dividing said substantially linear system of equations, prior to the computation of its solution, into K mutually independent sets, where K is a predetermined positive integer, and computing solutions separately for said K mutually independent sets.

9. The method of claim 1, wherein the transmitted pulses form a cyclically repeated pulse code defining a pulse trains having intervals between pulses wherein the interval between any two pulses in its cyclically repeated cycle is not equal to the interval between any other two pulses.

10. The method of claim 1, wherein the transmitted pulses form a pulse train having a plurality of pulses spaced in time by intervals wherein said intervals are continuously changing.

11. A system for remotely measuring a characteristic of one or more targets at a plurality of ranges along an antenna aiming line, comprising:
a transceiver means for transmitting pulses along an antenna aiming line and, in between transmissions of pulses, to receive reflections from said transmitted pulses; and
means for deriving from said reflections values of said characteristic at a plurality of ranges along said antenna aiming line, and for solving a substantially linear system of equations having a plurality of equations, each equation having a sum of one or more terms where each term is the product of a coefficient having a known value derived from the pulse forms of the transmitted pulse pulse train and an unknown quantity which is referred to herein as a variable, with the plurality of variables in said equations defining a matrix the elements of which are the value of said characteristic of said one or more targets at a plurality of ranges along said antenna aiming line of transmission of said pulses with the values of said matrix elements derived from said reflections of said transmitted pulses.

12. A system for remotely measuring a characteristic of one or more targets at a plurality of ranges along an antenna aiming line, comprising, connected in series,
a transmitter means for transmitting pulse trains having predetermined characteristic spacing toward one or more targets along said antenna aiming line,
a superhetrodyne receiver for receiving, at predetermined times, reflections of said pulses from said targets and mixing the frequency of the reflected signals down to a lower frequency to generate intermediate frequency versions of said received signals, and for digitizing the intermediate frequency versions of said reflected signals to produce a digital version of said received signal,
a detector for realizing in-phase and quadrature detection of said digital version of said received signal to generate an I/Q-detected signal,
a squaring block for squaring samples included in said I/Q-detected signal,
a solution block for a system of substantially linear equations $$Z=AP$$

having a solution represented by $$\overline{P}=BZ$$

where Z is a vector having elements representing squares of samples taken from said received signal at different moments of time, and A is a matrix having elements representing weighting functions, and P is a vector having elements representing actual reflectivity values of said one or more targets at a plurality of ranges, and $\overline{P}$ is a vector having elements representing reflectivity estimates at a plurality of ranges, and B is a matrix having elements values of which solve said substantially linear system of equations, said solution block for solving said system of equations to derive values of said elements of said matrix B, and
an end result block for generating information representing the reflectivity of said target or targets as said selected ranges on the basis of data of said matrix B produced by solving said system of equations.

13. The system of claim 12, further comprising, connected in series,
a correlation means for calculating delayed products in the form of the scatter autocorrelation function of the target or targets to enable Doppler shift measurement,
a solution block for a system of substantially linear equations $$Z=AP$$

having a solution which is $$\overline{P}=BZ$$

where Z is a vector having elements representing delayed products of a certain delay at different moments of time, said delayed products calculated from samples taken from said received signal, and A is a matrix having elements represent weighting functions, and P is a vector having elements representing actual values of an autocorrelation function at desired ranges, and $\overline{P}$ is a vector having elements representing autocorrelation function estimate at a plurality of ranges, and B is a matrix having elements values of which solve said substantially linear set of equations, said solution block for solving said system of equations to derive values of said elements of said matrix B, and
an end result block for generating information representing the Doppler shift of the target on the basis of data of matrix B produced by the correlation block.

14. The system of claim 13, further comprising a second receiver for producing digital samples representing the transmitted signal and for conducting said digital samples of said transmitted signal as reference data to said solution block for a system of equations to enable measurement of the phases of transmitted pulses.

* * * * *